United States Patent [19]

Zaunberger

[11] Patent Number: 4,998,591
[45] Date of Patent: Mar. 12, 1991

[54] ELECTRO-MECHANICAL DRIVE SYSTEM FOR A FULL-TRACK VEHICLE

[75] Inventor: Franz-Xaver Zaunberger, Augsburg, Fed. Rep. of Germany

[73] Assignee: Renk Aktiengesellschaft, Augsburg, Fed. Rep. of Germany

[21] Appl. No.: 447,375

[22] Filed: Dec. 7, 1989

Related U.S. Application Data

[60] Continuation of Ser. No. 412,612, Sep. 26, 1989, abandoned, Division of Ser. No. 234,204, Aug. 18, 1988, abandoned.

[51] Int. Cl.$^5$ ............................................. B62D 11/10
[52] U.S. Cl. .................................... 180/6.44; 180/6.7; 180/9.44
[58] Field of Search ............... 180/6.44, 6.7, 9.44, 180/79.1; 475/18, 28

[56] References Cited

U.S. PATENT DOCUMENTS

| 1,984,830 | 12/1934 | Higley | 180/6.44 U X |
| 1,991,094 | 2/1935 | Higley | 180/6.44 U X |
| 2,027,218 | 1/1936 | Armington | 180/6.44 X |
| 3,966,005 | 6/1976 | Binger | 180/6.44 |
| 4,215,755 | 8/1980 | Waterworth et al. | 180/6.44 |
| 4,280,579 | 7/1981 | Zaunberger et al. | 180/6.44 |
| 4,557,157 | 12/1985 | Oestmann | 74/607 |

FOREIGN PATENT DOCUMENTS

| 1913011 | 9/1970 | Fed. Rep. of Germany . |
| 1613926 | 1/1971 | Fed. Rep. of Germany . |
| 2114951 | 5/1984 | Fed. Rep. of Germany . |
| 2047643 | 12/1980 | United Kingdom . |
| 2074519 | 11/1981 | United Kingdom . |

Primary Examiner—Charles A. Marmor
Assistant Examiner—Michael Mar
Attorney, Agent, or Firm—Darby & Darby

[57] ABSTRACT

An electric motor drives via differential gear arrangement the track-driving wheels of the tracks of a full-track vehicle. The steering of the full-track vehicle takes place through a further electric motor, through which, depending on the travel direction of the full-track vehicle, a rotational speed can be superimposed on the differential gear arrangement with different rotational speeds. The current supply of the drive motor and of the steering motor occurs via a control and regulating equipment, as a function of adjustments of a drive member and of a steering member, from an electric generator which is driven by a diesel engine.

11 Claims, 3 Drawing Sheets

ELECTRO-MECHANICAL DRIVE SYSTEM FOR A FULL-TRACK VEHICLE

This is a continuation of Ser. No. 07/412,612, filed Sept. 26, 1989, now abandoned which is in turn a divisional application of Ser. No. 07/234,204, filed Aug. 18, 1988, now abandoned.

PRIORITY

Priority under 35 U.S.C. § 119 is claimed for the invention disclosed and claimed herein, based upon German application no. P 37 28 171.2, filed Aug. 24, 1987. The entire disclosure of the priority document is expressly incorporated herein.

BACKGROUND OF THE INVENTION

A. Field of the Invention

The invention relates generally to drive systems for a tracked vehicles, such as an armored tank. More specifically, the invention is directed to an electro-mechanical drive system for a full-track vehicle, the drive system including both electric motors and gearing means for mechanically transferring power from one to the other side of the vehicle, for the propulsion and steering of the track-drive wheels of the full-track vehicle.

B. Description of the Related Art

German publication DE-PS 21 14 951 describes a presently known purely mechanical drive system for a fulltrack vehicle, such as a tank. The known drive system includes a drive motor, at least one steering control unit, a differential gear arrangement, a drive control connection between the drive motor and a drive control element of the differential gear arrangement, a steering control connection between the steering control unit and a steering control element of the differential gear arrangement, and two control outputs of the differential gear arrangement for driving track-driving wheels of the full-track vehicle.

The driving motor is normally a diesel motor. From it a drive control connection containing a gear shift goes to drive control elements of two differential gear sets in the form of two planetary gears. Further, from the drive motor a steering control connection containing a steering control unit goes to steering control elements of the two differential gears. Instead of the mechanical steering control unit, hydraulic steering control units are also known. In addition, diesel-electric drive systems are known as well. In these diesel-electric drive systems, each track-driving wheel has its own electric motor with a reduction gear. The current for these electric motors is generated by a generator which is driven by a diesel engine. When the tracked vehicle runs through curves, the outer track requires much more power than the inner track. In the known diesel-electric drive system this has the disadvantage that the wattless output occurring in curves must be transmitted electrically in the form of a power transfer from the inner track to the outer track. This requires higher-rated electric motors going beyond the maximum required drive power on each side of the vehicle and results in increased cost of control and regulating equipment of the drive system.

Furthermore, the speeds and torques of the track-driving wheels must be regulated as a function of the particular position of the accelerator pedal or gas pedal, and also of the steering wheel under continually changing external influences. Such external influences are, in particular, the continually changing nature of the ground on which the tracked vehicle runs, as well as the frequent movements of the steering wheel of the tracked vehicle.

SUMMARY OF THE INVENTION

The invention solves the foregoing disadvantages by providing a drive system where the scope of mechanical gearings and hydraulic equipments is substantially reduced as compared with the known mechanical and mechanical-hydraulic drive systems, while at the same time avoiding large electric motors which are over-dimensioned far beyond those required for pure drive control power.

According to the invention, the drive motor is an electric motor, the steering control unit is an electric motor, and the drive motor and the steering motor can be supplied with electric energy from a generator which may be driven by an internal combustion engine.

The principal solution of the invention consists in the combination of electric motors and mechanical gearings in such a way that the power transfer between the track-driving wheels from one to the other side of the vehicle occurs mechanically rather than electrically, but that the driving work and the steering work is produced by electric motors. A power transfer from a track-driving wheel on one vehicle side to a track-driving wheel on the other vehicle side takes place not only in curves but also when the tracks have become stuck on difficult terrain, e.g., in ruts, and must break loose from the terrain soil, which requires maximum drive output and/or steering output of the vehicle motor.

According to the invention, therefore, separate electric motors for the drive control and for the steering control are provided in combination with at least one differential gear. Wattless power transfer over the electric system, that is, over the electric motors, is thus avoided. According to the invention, this wattless power is transmitted by the mechanical part of the gear arrangement, that is, by the differential gear arrangement, between the two sides of the vehicle. The control and regulating equipment required for the drive system is thereby greatly simplified, since by the invention only one function, i.e., "driving" or "steering," is assigned to each electric motor.

In addition, the drive system according to the invention has the advantage that the elements known from conventional mechanical or mechanical-hydraulic, in particular hydrodynamic-mechanical, drive systems can be used in the same manner also in the drive system according to the invention. In particular, generally known reduction gears and shift gears and combination brake systems, in particular the combination of mechanical and hydraulic brakes, can be integrated into the drive system according to the invention.

BRIEF DESCRIPTION OF THE DRAWINGS

Additional features and advantages of the claimed invention will be more readily understood in light of the following detailed description, taken in conjunction with the drawings, in which:

DETAILED DESCRIPTION OF THE PREFERRED EMBODIMENTS

The invention relates to an electric-mechanical drive system for a full-track vehicle. "Full-rack vehicles" are tracked vehicles, e.g., tanks, which run, not on wheels, but on tracks ("chains"), and which are able to run curves due to the fact that the track on one side of the vehicle is driven at a different speed than the track on the other side of the vehicle. For this purpose it is necessary to superimpose vehicle steering commands on the drive control unit. Such drive systems are known and are described in, for example, German patent DE-PS 21 14 951 and U.S. Pat. No. 4,280,579. The entire disclosures of these documents are hereby expressly incorporated herein by reference, so that a detailed description of the principle of superimposed steering is not necessary.

Figure 1:
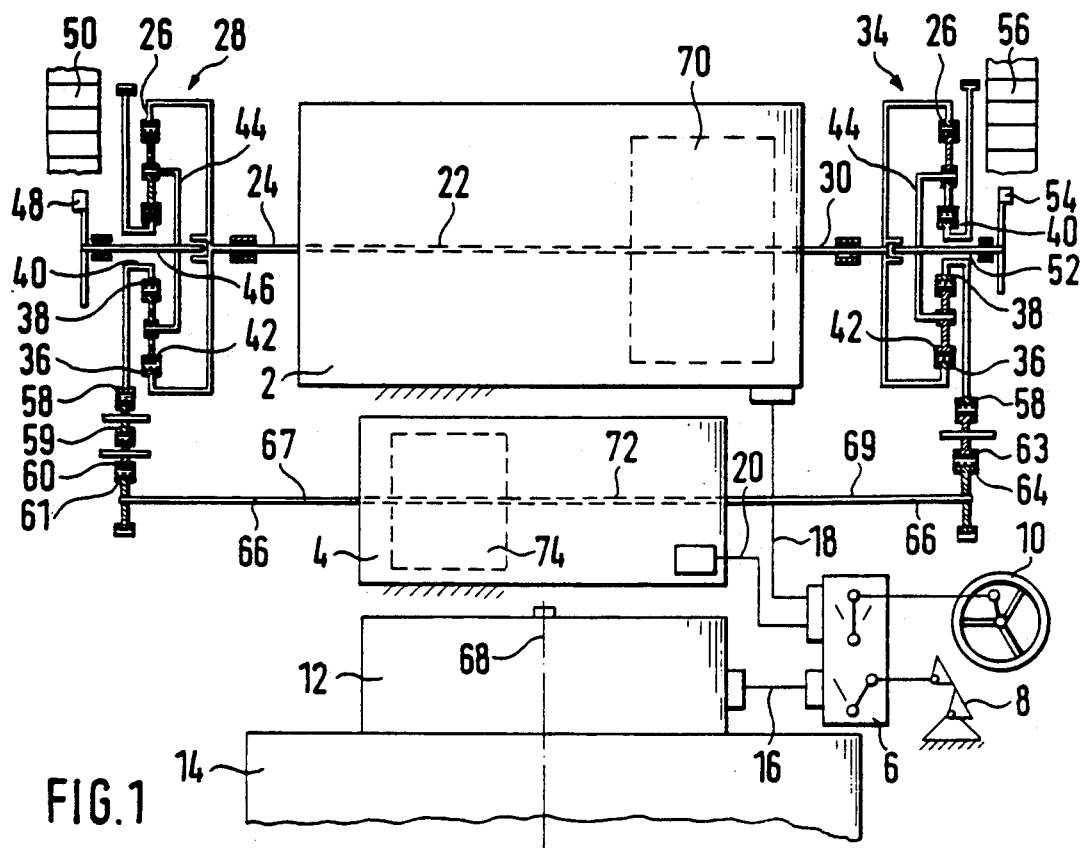
FIG. 1 is a schematic top view of an electro-mechanical drive system for a full-track vehicle according to the invention.

The electric-mechanical drive system for a fulltrack vehicle according to the invention, illustrated in FIG. 1, includes a drive motor 2 and a steering motor 4, which are supplied with electric energy via control and regulating equipment 6 as a function of adjustments (settings) of an accelerator pedal 8 and of a steering member 10 by an electric generator 12, and are thereby controlled and regulated. The generator 12 is driven by an internal combustion engine 14, preferably a diesel engine. The control and regulating equipment 6 is connected via electric lines 18 to the drive motor 2, and via electric lines 20 to the steering motor 4. A shaft 22 of the drive motor 2 is connected via a shaft section 24, at the left with reference to FIG. 1, to the ring gear 26 of a differential gear 28, at left with reference to FIG. 1, and in addition via a shaft section 30, at right with reference to FIG. 1, to a ring gear 26 of a differential gear 34, at right with reference to FIG. 1. The shaft sections 24 and 30 thus form a drive control connection to the drive control elements in the form of ring gears 26 of the differential gear arrangement 28, 34. Between an inner rim 36 of the ring gears 26 and an outer rim 38 of an inner central or sun wheel 40 are planets gears 42 in engagement therewith which are mounted rotatably on a planet carrier 44. The planet carriers 44 of the two differential gear sets 28 and 34 provide drive outputs of the differential gear arrangement 28, 34, which are connected via an output shaft 46, at left with reference to FIG. 1, to a left track-driving wheel 48 for the propulsion of a left track 50, and via a right-hand output shaft 52 to a right track-driving wheel 54 for the propulsion of a right track 56 of the tracked vehicle.

The rotational speed of the planet carriers 44 serving as drive outputs, and hence also the velocity of the tracks 50 and 56, depends not only on the rotational speed of the ring gears 26, but also on the speed of the sun wheels 40. The sun wheels 40 are provided with a gear 58 coaxial with them. The gear 58 of the left differential gear 28 is connected via three gears 59, 60, 61, and the gear 58 of the right differential gear 34 via two gears 63, 64, to a neutral shaft 66. The steering motor 4 is arranged coaxially on the neutral shaft 66 and holds the latter at standstill when the tracks 50 and 56 are driven at equal speed for straight travel of the tracked vehicle. To enable the vehicle to run a curve, the drive motor 4 drives the neutral shaft 66 in one or the other direction of rotation, depending on whether the vehicle runs a left-hand or a right-hand curve. As the number of gears 58, 59, 60 and 61 on the left side is different from the number of gears 58, 63, 64 on the right side, the drive direction of rotation of the neutral shaft 66 is transmitted in mutually opposite directions to the sun wheels 40 of the two differential gears 28 and 34. Thereby, in a curve, one track, e.g., 50, is decelerated and the other track, e.g., 56, is accelerated, or vice versa, depending on the direction of the curve.

The drive motor 2 is arranged coaxially on shaft 22 and hence coaxially to the axis of rotation of the planet carriers 44 serving as drive outputs, and furthermore it is axis-parallel alongside the steering motor 4. The axis of rotation 68 of the generator 12 and of the internal combustion engine 14 is at right angles to the axes of rotation of the neutral shaft 66 and of the planet carriers 44.

According to a modified form of the embodiment of FIG. 1, the shaft 22 of the drive motor 2 may be connected via a shift gear 70 to the shaft sections 24 and 30. Further, shaft 72 of the steering motor 4 may be connected via a reduction gear 74 to the neutral shaft 66. In FIG. 1, the gearings 70 and 74 are shown schematically in broken lines.

In these embodiments of the drive system according to the invention, the electric generator 12 and the drive motor 2 are designed for a continuous output which is equal to the continuous output of the internal combustion engine 14. The steering motor 4 need not be designed for so high a continuous output; instead it suffices if it is rated for a short-term output of between 60% and 100% of the continuous output of the drive motor 2, depending on the particular type of full-track vehicle. Neither motor 2 nor the steering motor 4 need be designed for overly high outputs for extreme driving conditions.

The speed and/or torque of the drive motor 2 is controlled as a function of the particular setting of the accelerator pedal 8. The speed and/or torque of the steering motor 4 is controlled as a function of the particular setting of the steering member 10. During straight travel of the tracked vehicle, the steering motor 4 is electrically stabilized at zero speed, that is, in standstill or idle. When the vehicle travels through a curve, a power transfer takes place from the inner track, e.g., 50, to the outer track, e.g. 56. The power transmitted during this power transfer is called "wattless power"; according to the invention it flows over the mechanical part of the drive system, but not over the electrical part. Owing to this, the electrical parts, that is, the drive motor 2 and the steering motor 4, can be designed for smaller outputs than in a drive system where the wattless power is transferred over the electrical parts from the inner track to the outer track. "Wattless power" is the power which in certain travel states is released upon delay of a track 50 and is transferred to the track 56 on the other side.

In the embodiment illustrated in FIG. 1, the neutral shaft 66 and shaft 72 of the steering motor 4 form a single shafting. This shafting may be formed as follows. Shaft 72 of the steering motor 4 is designed as a hollow shaft, the neutral shaft 66 being passed through it and connected with it. Alternatively, the neutral shaft 66 consists of two sections 67 and 69, one of which is fastened at one end and the other at the other end of shaft 72.

Similarly, shaft 22 of the drive motor 2 may be a hollow shaft, and the shaft sections 24 and 30 may be a component part of a one-piece shaft passed through the hollow shaft 22, or the shaft sections 24 and 30 may be formed by separate shafts, each connected with shaft 22 of the drive motor 2. The connection may be either direct or via a gearing, in the case of the drive motor 2 via the gearing 70 or in the case of the steering motor 4 via the gearing 74.

In FIGS. 2-6, corresponding parts have been labeled with the same reference numerals as in FIG. 1. The parts of the various figures will be described in the following detailed description only insofar as they have not already been described with reference to another figure.

Figure 2:
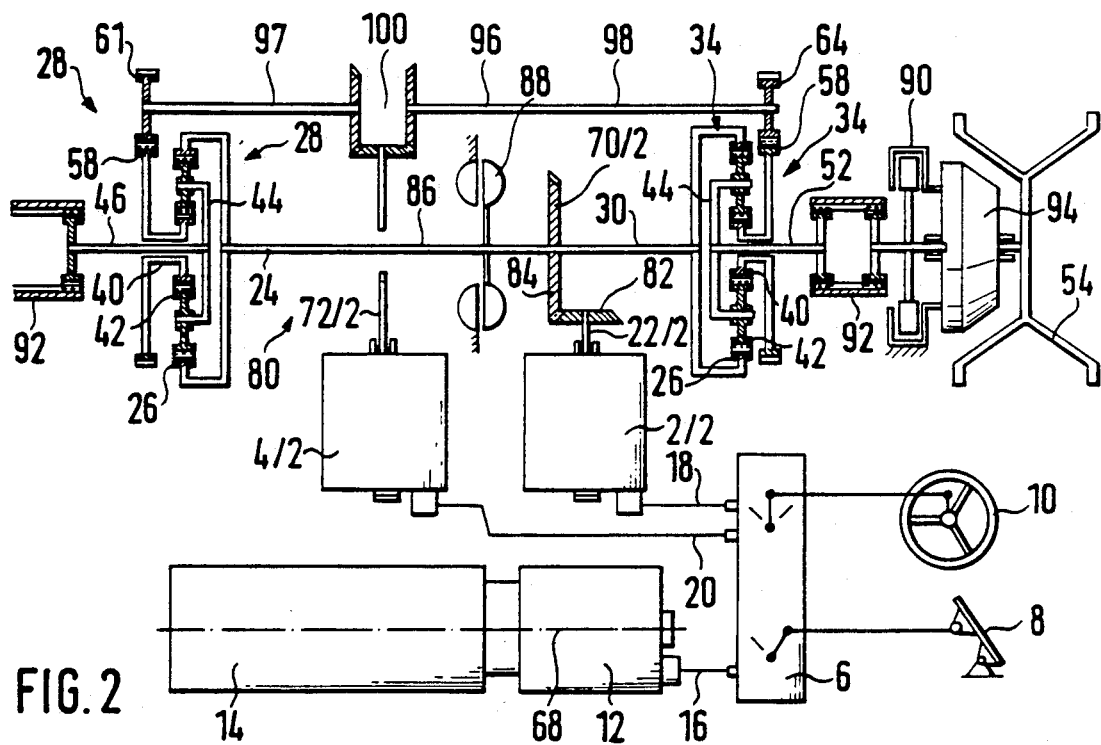
FIG. 2 is a schematic top view of another embodiment of an electric-mechanical drive system for a full-track vehicle according to the invention.

In the electric-mechanical drive system illustrated in FIG. 2, the drive motor 2/2 and the steering motor 4/2 with their shafts 22/2 and 72/2 are arranged at right angles to the axes of rotation of the planet carriers 44 forming the drive outputs and their output shafts 46 and 52, in a space 80 between the two differential gears 28 and 34. The electric generator 12 and the internal combustion engine 14 driving it are arranged at right angles to shaft 22/2 of the drive motor 22/2 and to shaft 72/2 of the steering motor 4/2 and hence parallel to the axes of rotation of the planet carriers 44. Via bevel gears 82 and 84 of the gearing 70/2, which is a reduction gear, the shaft 22/2 of the drive motor 2/2 is connected in drive engagement with a main shaft 86 whose end sections 24 and 30 are connected in driving engagement with the ring gears 26 of the two differential gears 28 and 34 and are arranged axially in the axis of rotation thereof. Disposed on the main shaft 86 is a hydrodynamic flow brake 88, which in combination with mechanical brakes 90 forms part of a brake system as described in German publication DE-PS 21 14 951, and which serves to brake the tracked vehicle.

The output shafts 46 and 52 are each connected in drive equipment with the driving wheels 48 and 54 for the tracks via a mechanical clutch 92 and a reduction gear 94. The mechanical brakes are located on each vehicle side between the clutch 92 and the reduction gear 94. A neutral shaft 96 is a so-called "divided neutral shaft," consisting of two neutral shaft sections 97 and 98 which are in driven engagement with one another via reversing gear 100 arranged between them, and which are either held by shaft 72/2 of the steering motor 4/2 in standstill, or are driven in opposite directions of rotation to each other, depending on the direction of travel of the tracked vehicle. Because the neutral shaft sections 97 and 98 are driven in opposite directions in the embodiment of FIG. 2, in contrast to FIG. 1, the number of gears 61 and 58 on the left side and 64 and 58 on the right side of the vehicle by which the neutral shaft sections 97 and 98 are in driving engagement with the sun wheel 40 of the two differential gears 28 and 34 is the same. Due to this, as in the embodiment of FIG. 1, in travelling through a curve, the track, e.g., 50, situated inside with respect to the curve radius is driven at a reduced speed, and the track, e.g., 56, situated on the outside, at increased speed.

In this embodiment, too, the electric generator 12 and the drive motor 2/2 are designed for a continuous output equal to the internal combustion engine 14. The steering motor 4/2 is designed only for a short-term output of between 60% and 100% of the continuous output of the engine 14, depending on the type of tracked vehicle. Rating for outputs beyond the normal drive and steering mode is not necessary.

Figure 3:
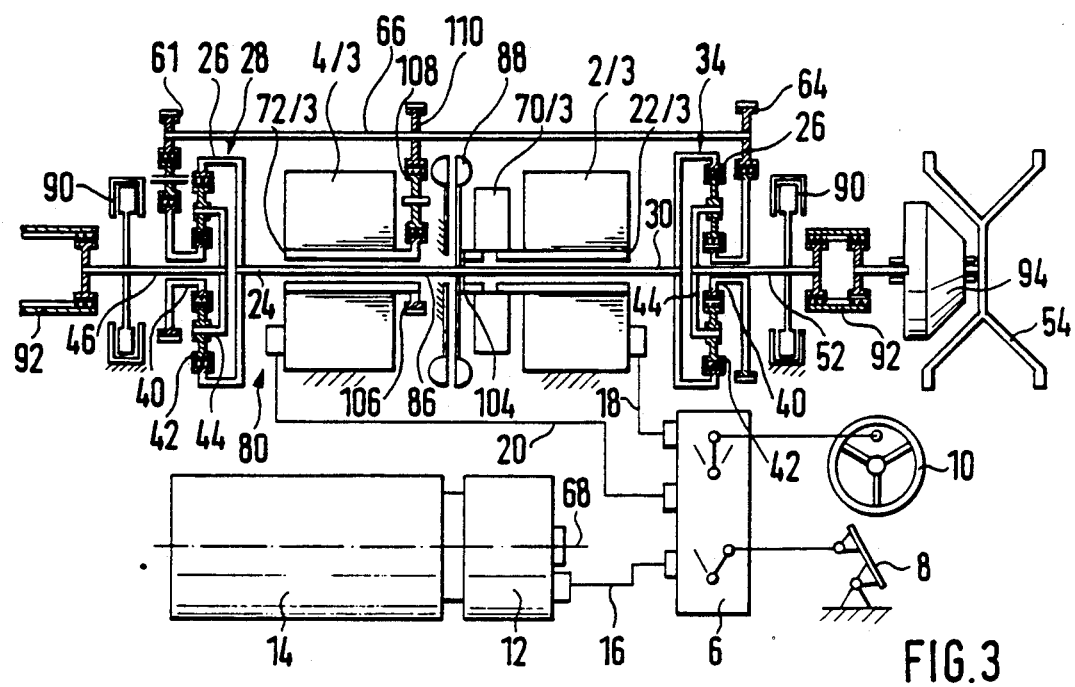
FIG. 3 is a schematic top view of still another embodiment of the invention.

FIG. 3 shows another embodiment employing the same principle as the forms according to FIGS. 1 and 2. Here, as in FIG. 1, the design according to FIG. 3 contains a one-piece neutral shaft 66 and, as in FIG. 2, a hydrodynamic flow brake 88 fastened on the main shaft 86, mechanical brakes 90, here arranged on the output shafts 46 and 52, and clutches 92 by which the output shafts 46 and 52 are connected with the track-driving wheels 48 and 54 via reduction gear 94. The neutral shaft 66 is in drive engagement on the left vehicle side through gears 61, 59 and 58 with the sun wheel 40 of the left differential gear 28, and on the right vehicle side through gears 64 and 58 with the sun wheel 40 of the right differential gear 34.

A major difference of design consists in that in the embodiment of FIG. 3, the drive motor 2/3 and the steering motor 4/3 are arranged axially one behind the other coaxially around the main shaft 86, in the space 80 between the two differential gears 28 and 34. Shaft 22/3 of the drive motor 2/3 is a hollow shaft arranged coaxially around the main shaft 86. A gearing 70/3, which may be a reduction gear or a shift gear, is also arranged coaxially around the main shaft 86 and connects shaft 22/3 of the drive motor 2/3 via a hollow connecting shaft 104 with the main shaft 86 and simultaneously with the hydrodynamic flow brake 88. The gearing 70/3 and the hydrodynamic flow brake 88 are arranged between the drive motor 2/3 and the steering motor 4/3.

Between these two motors is also a gear 106 disposed coaxially around the main shaft 86, which gear is in drive connection on the one hand with the hollow shaft 72 of the steering motor 4/3 and, on the other hand, via gears 108 and 110, with the neutral shaft 66. The generator 12 and the engine 14 driving it are arranged with their shaft 68 axis-parallel to the main shaft 86. This embodiment with the drive motor 2/3 coaxial to the main shaft 86 and with the steering motor 4/3 has the advantage that it is very compact and requires little space.

In the above-described embodiments of the invention two differential gears 28 and 34 in the form of planetary gears are used. The embodiments of the electromechanical drive system according to the invention described in the following relate to arrangement with only one differential gear. This differential gear can again be a planetary differential gear or, as represented as an example, a bevel gear differential gear.

Figure 4:
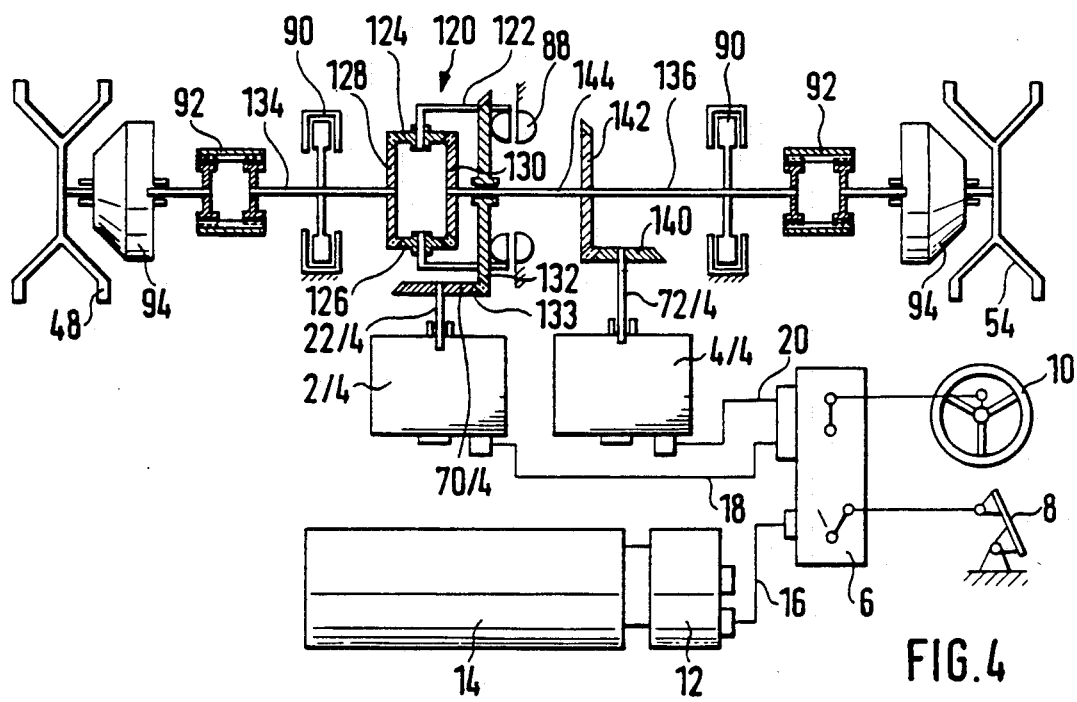
FIG. 4 is a schematic top view of still another embodiment of an electric-mechanical drive system for a full-track vehicle according to the invention.

In the embodiment according to FIG. 4, a drive motor 2/4 and a steering motor 4/4 are supplied with electric energy by the generator 12 via control and regulating equipment 6, which generator is driven by an internal combustion engine 14 designed as a diesel engine. A bevel differential gear 120 consists of a rotatable carrier 122, two axially spaced bevel gears 124 and 126 rotatably mounted in the carrier 122, and two axially spaced additional bevel gears 128 and 130, the axes of rotation of the two additional bevel gears 128 and 130 extending at right angles to the axes of rotation of the first-named two bevel gears 124 and 126, all four bevel gears being in engagement with one another in the form of a continuous gear train. Carrier 122 is connected coaxially to its axis of rotation with a bevel pinion 132, which meshes with an additional bevel pinion 133 and forms a gearing 70/5. The bevel pinion 133 is secured on shaft 22/4 of the drive motor 2/4, so that the latter drives the carrier 122. The two mutually axial bevel gears 128 and 130 form the drive outputs of the differential gear 120 and are connected by a clutch 92 via output shafts 134 and 136, on which a mechanical vehicle brake 90 is arranged. Through clutches 92 and reduction gears 94 disposed on the outer side thereof, the output shafts 134 and 136 are releasably connected with track-driving wheels 48 and 54. The carrier 122 and its pinion 132 are rotatably mounted on the output shaft 136, and can be braked by a hydrodynamic flow brake 88. The bevel pinions 133 and 132 with the hydrodynamic flow brake 88 form a rive control connection between the drive motor 2/4 and the differential gear 120. Fastened on shaft 72/4 of the steering motor 4/4 is a bevel gear 140 which meshes with a bevel gear 142 which is disposed on the output shaft 136 and firmly connected with it. The gears 140 and 142 form together with a shaft section 144 of the output shaft 136 a steering control connection between the steering motor 4/4 and the bevel gear 130, which thus is the drive output and at the same time the steering control element of the differential gear 120.

The drive motor 2/4 and the steering 4/4 have the same design with respect to output or power as the motors 2, 2/2, 2/3 and 4, 4/2, 4/3 of the embodiments according to FIG. 1, 2, and 3. During straight travel, however, the steering motor 4/4 runs no-load synchronously with the speed of the drive motor 2/4. For curved travel of the tracked vehicle the speed of the steering motor 4/4 is adjusted, as a function of the position of the steering member 10, higher or lower—depending on the curve direction—than the speed synchronous with the drive motor 2/4, and is adjusted to the set value by manipulation of the control and regulating equipment 6.

Figure 5:
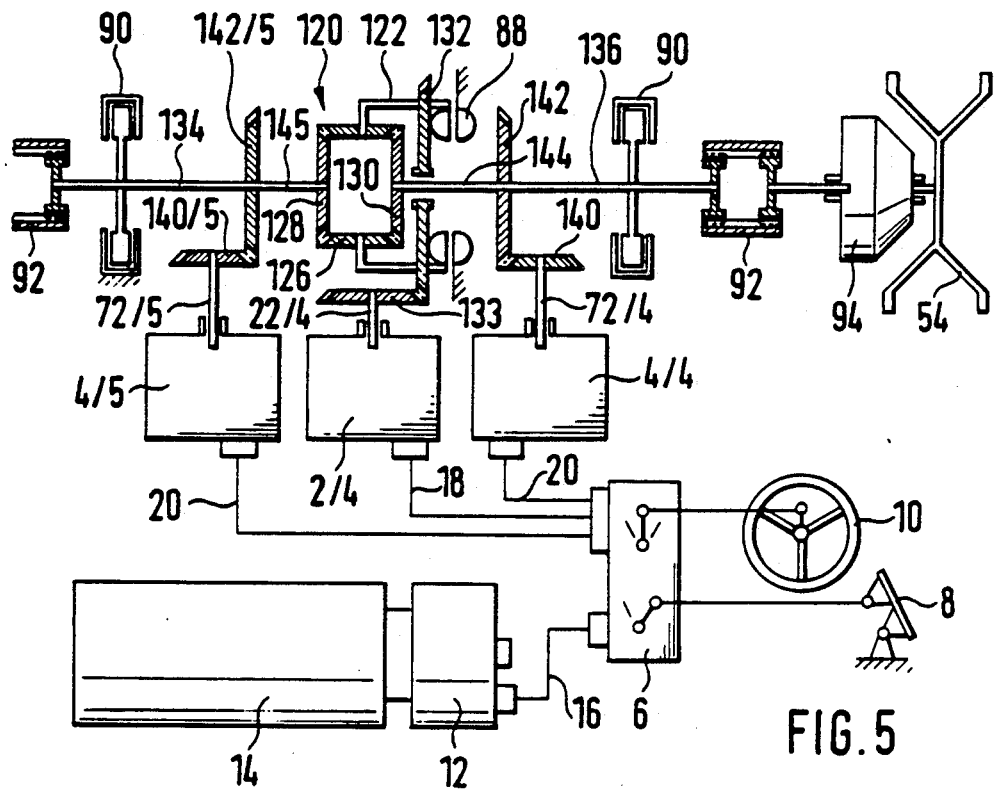
FIG. 5 is a schematic top view of a further embodiment according to the invention.

In the further embodiment according to FIG. 5, there is provided in addition to the elements and to the steering motor 4/4 of FIG. 4, a second steering motor 4/5, whose shaft 72/5 is connected through bevel gears 140/5 and 142/5 in drive engagement with the output shaft 134 shown at left in the drawings. Accordingly, one drive motor 2/4 and two steering motors 4/4 and 4/5 act on a bevel-gear differential gear 120. Shaft 22/4 of the drive motor 2/4 is in drive engagement through the bevel pinions 132 and 133 with the carrier 122 of the differential gear 120, and each of the shafts 72/4 and 72/5 of the two steering motor 4/4 and 4/5 are in drive engagement through gears 140,142 and 140/5, 142/5 with one of the two output shafts 136 and 134 of the differential gear 120. This form of realization has the advantage over the forms of FIGS. 1 to 4 that both steering motors 4/4 and 4/5 can be used at the same time to support the drive control as well. For this reason all three motors 2/4, 4/4, and 4/5 need be designed only for a continuous output of 1/3 and a short-term output of only about 50% of the maximum output of the internal combustion engine 14.

The drive motor 2/4 is controlled only by the accelerator pedal 8, while the two steering motors 4/4 and 4/5 are controlled dependently both by the accelerator pedal 8 and the steering member 10. The differential gear 120, the gearing 140, 142 connecting the steering motor 4/4 to the right-hand output shaft 136, the hydrodynamic flow brake 88, and the two mechanical brakes 90 are arranged and operate in the same manner as in the embodiment of FIG. 4.

The gears 140/5 and 142/5 form together with a shaft section 145 of the left output shaft 134 a steering control connection between the left steering motor 4/5 and the left bevel gear 128 of the differential gear 120. This left bevel gear 128 is thus a drive output and at the same time a steering control element of the differential gear 120.

Figure 6:
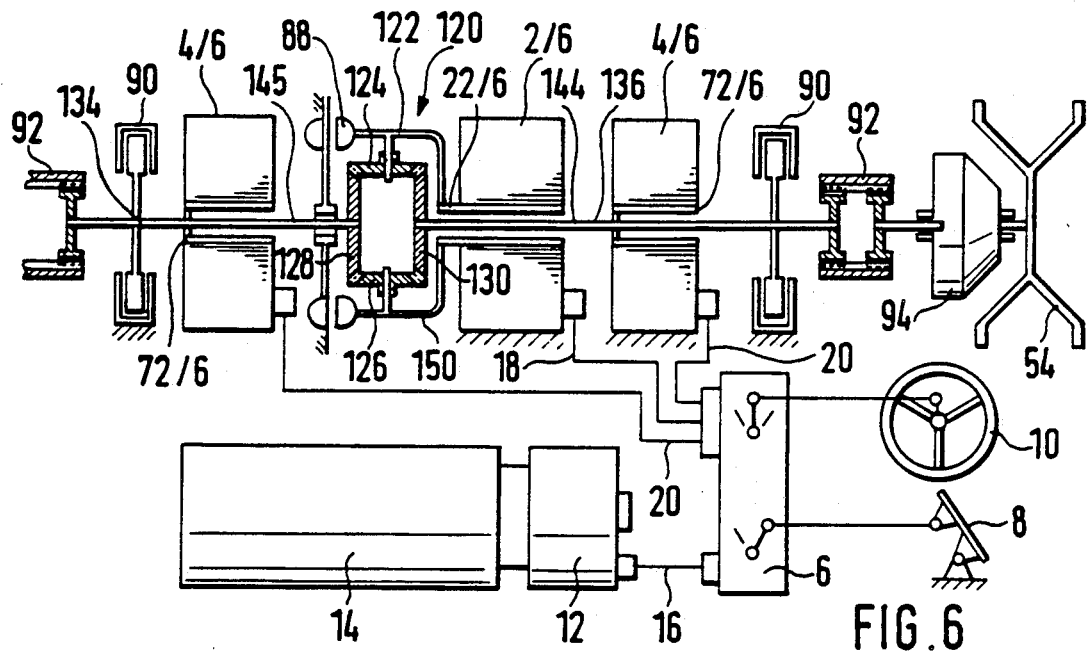
FIG. 6 is a schematic top view of still another embodiment according to the invention.

The further embodiment of the invention illustrated in FIG. 6 operates on the same principle as the embodiment of FIG. 5. The difference is that in FIG. 6 the drive motor 2/6 and the two steering motors 4/6 are arranged coaxial with the output axes of rotation of the bevel-gear differential gear 120. The drive motor 2/6 is arranged coaxial around the output shaft 136 and is connected by its shaft 22/6, designed as a hollow shaft, to the carrier 122. The steering motor 4/6 on the right side is also arranged coaxial around the output shaft 136, and its shaft 72/6, designed as a hollow shaft, is connected with the output shaft 136. This steering motor 4/6 and the drive motor 2/6 are arranged between the differential gear 122 and the mechanical brake 90 cooperating with the output shaft 136 and shown at the right in FIG. 6, the drive motor 2/6 being located between the differential gear 122 and the steering motor 4/6. The steering motor 4/6 on the left side is arranged coaxial to the left output shaft 134 between the differential gear 122 and the left mechanical brake 90. Shaft 72/6 of the left steering motor 4/6 is designed as a hollow shaft and connected with the left output shaft 134, which extends through the hollow shaft 72/6.

The hydrodynamic flow brake 88 cooperates with the carrier 122 of the differential gear 120. The position of the flow brake 88 is appropriately selected so that it requires the least space. In FIG. 6, the drive control connection between the hollow shaft 22/6 of the drive motor 2/6 and the carrier 122 of the differential gear 120 is formed by an adapter ("connection piece") 150. The drive control element of the differential gear is its carrier 122. The steering control connection between the steering motor 4/6 shown at right and the differential gear 120 is formed by the section 144 of the output shaft 136 which connects the hollow shaft 72/6 of the right steering motor 4/6 with the right bevel gear 130 of the differential gear 120. Hence the right bevel gear 130 is not only the drive output of the differential gear 120, but at the same time also its steering control element for the right steering motor 4/6.

The steering control connection between the left steering motor 4/6 and the differential gear 120 is established by a shaft section 145 of the left output shaft 134, which section connects the hollow shaft 72/6 of the left steering motor 4/6 with the left bevel gear 128 of the differential gear 120. Owing to this, the left bevel gear 128 is not only the left drive output of the differential gear 120, but at the same time also its steering control element.

All embodiments of the invention have the further advantage that the internal combustion engine 14 can run continuously and consistently at a speed which is within the most favorable fuel range of the engine. Another advantage consists in that the drive motor 2,2/1 to 2/6 and the steering motor 4, 4/2 to 4/6 can be used also to produce a brake action which support the brake action of the mechanical brakes 90 and that of the hydrodynamic brake 88. Here, all these elements can exert a brake action simultaneously or successively as a function of a certain program, and the brake actions of the individual elements may be apportioned in a certain ratio.

Numerous variations and modifications, in addition to those already described, will be plain to those skilled in the art. These changes do not depart from the basic spirit of the invention.

What is claimed is:

1. An electro-mechanical drive system for a full-track vehicle, comprising:
   an electric drive motor for driving track-driving wheels of the vehicle;
   at least one steering control unit in the form of an electric motor for controlling the track-driving wheels so as to steer the vehicle, wherein the drive motor and the steering control motor are supplied with electric energy from an electric generator which is driven by an internal combustion engine;
   a differential gear arrangement including two differential gear sets connected to the track-driving wheels of the vehicle;
   a drive control connection between the drive motor and the differential gear arrangement;
   a steering control connection between the steering control motor and a steering control element of the differential gear arrangement;
   wherein the drive control connection comprises first and second portions of a drive shaft disposed between the differential gears, and the drive motor is disposed coaxially about and in driving engagement with the first drive shaft portion, and the steering control motor is disposed coaxially about the second drive shaft portion;
   and two control outputs of the differential gear arrangement disposed coaxially with the first and second drive shaft portions for driving the track-driving wheels, whereby both the drive motor and the steering control motor are disposed between differential gear sets, and said first and second drive shaft portions are coaxial with respect to the axis of rotation of the track-driving wheels.

2. The drive system according to claim 1, wherein the differential gear arrangement comprises two differential gear sets, each of which includes one of the two control outputs, a drive control element and a steering control element;
   wherein the drive control elements of both differential gear sets are in driving engagement with the drive motor via their respective drive control connections;
   and wherein the steering control elements of both differential gear sets are in driving engagement with the common steering control unit electric motor.

3. The drive system according to claim 2, further comprising both a mechanical brake and at least one hydrodynamic brake in mechanical engagement with the control outputs so as to provide a brake effect on the track-driving wheels.

4. The drive system according to claim 3, wherein the drive control connection between the drive motor and the differential gear arrangement includes a gear shift.

5. The drive system according to claim 2, wherein the drive control connection between the drive motor and the differential gear arrangement includes a gear shift.

6. The drive system according to claim 1, further comprising both a mechanical brake and at least one hydrodynamic brake in mechanical engagement with the control outputs so as to provide a brake effect on the track-driving wheels.

7. The drive system according to claim 6, wherein the drive control connection between the drive motor and the differential gear arrangement includes a gear shift.

8. The drive system according to claim 1, wherein the drive control connection between the drive motor and the differential gear arrangement includes a gear shift.

9. An electro-mechanical drive system for a full-track vehicle, comprising:
   two differential gear sets connected to track-driving wheels of the vehicle;
   a main shaft disposed between said differential gear sets for drivingly connecting drive inputs of the two differential gear sets with each other;
   an electric drive motor disposed coaxially about the main shaft;
   an electric steering motor disposed coaxially about the main shaft, the electric drive motor and the electric steering motor being arranged axially one behind the other;
   a first gearing arranged coaxially around the main shaft and connecting the main shaft with the electric drive motor;
   a neutral shaft located parallel to the main shaft, and drivingly connecting steering inputs of the two differential gear sets with each other;
   a second gearing drivingly connecting the electric steering motor with the neutral shaft; and
   the two differential gear sets each having a gear output for driving a track-driving wheel,
   said drive motor and said steering motor being arranged between said differential gear sets, and said main shaft being coaxial with respect to the axis of rotation of the track-driving wheels.

10. The drive system according to claim 9, wherein a hydrodynamic flow brake is fastened on the main shaft.

11. The drive system according to claim 9, wherein the electric generator and the internal combustion engine ate arranged axially one behind the other, and both are arranged in a position parallel to the main shaft and parallel to the neutral shaft.

* * * * *